(12) United States Patent
Bushey et al.

(10) Patent No.: US 7,657,020 B2
(45) Date of Patent: Feb. 2, 2010

(54) CALL ROUTING SYSTEM AND METHOD OF USING THE SAME

(75) Inventors: Robert R. Bushey, Cedar Park, TX (US); Sarah Korth, Chicago, IL (US); Benjamin Anthony Knott, Round Rock, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 1023 days.

(21) Appl. No.: 11/144,375

(22) Filed: Jun. 3, 2005

(65) Prior Publication Data

US 2006/0291642 A1  Dec. 28, 2006

(51) Int. Cl.
*H04M 3/00* (2006.01)
*H04M 5/00* (2006.01)
*H04M 1/56* (2006.01)
*H04M 15/06* (2006.01)

(52) U.S. Cl. .......................... 379/265.01; 379/142.05; 379/265.02

(58) Field of Classification Search ............ 379/265.01, 379/114.02, 88.03, 88.01, 142.05, 265.02
See application file for complete search history.

(56) References Cited

U.S. PATENT DOCUMENTS 7,317,787 B2 * 1/2008 Crockett et al. .......... 379/88.03
2002/0106065 A1 * 8/2002 Joyce et al. ............ 379/114.02

* cited by examiner

*Primary Examiner*—Thjuan K Addy
(74) *Attorney, Agent, or Firm*—Toler Law Group

(57) ABSTRACT

A call routing system can be used to route calls. An action object identifier, a result identifier, and a reason identifier can be generated in response at least in part to a call. The call can be routed by the call routing system based at least in part on the action object identifier, the result identifier, and the reason identifier. The routing can be performed automatically without requiring an attendant. In another embodiment, an attendant can be used, if desired. In still another embodiment, the processing of the call can be interrupted by the caller, a data processing system used within the call routing system, or an attendant. In a particular embodiment, the call routing system can be used when authenticating a caller or determining an account status of the caller.

25 Claims, 6 Drawing Sheets

CALL ROUTING SYSTEM AND METHOD OF USING THE SAME

BACKGROUND

1. Field of the Disclosure

The present disclosure relates to call routing systems, and more particularly to methods, data processing systems, and data processing system readable media for use in call routing systems.

2. Description of the Related Art

Many businesses use call service centers as a way to conduct business with their customers. Operating a call services center can be expensive, particularly, if an attendant needs to interact with every or nearly every caller. Automating call service centers typically includes using a call routing system. Insufficient information may be provided to a call routing system. If insufficient information is provided, the call may be routed to an improper destination, or the call may need to be manually dispositioned by an attendant. The former can be problematic because it can increase the caller's frustration with the call service center and may result in potential lost revenue. The latter can be problematic because the purpose of automating is to reduce having calls, that could otherwise be properly routed, manually dispositioned by an attendant.

Figure 1:
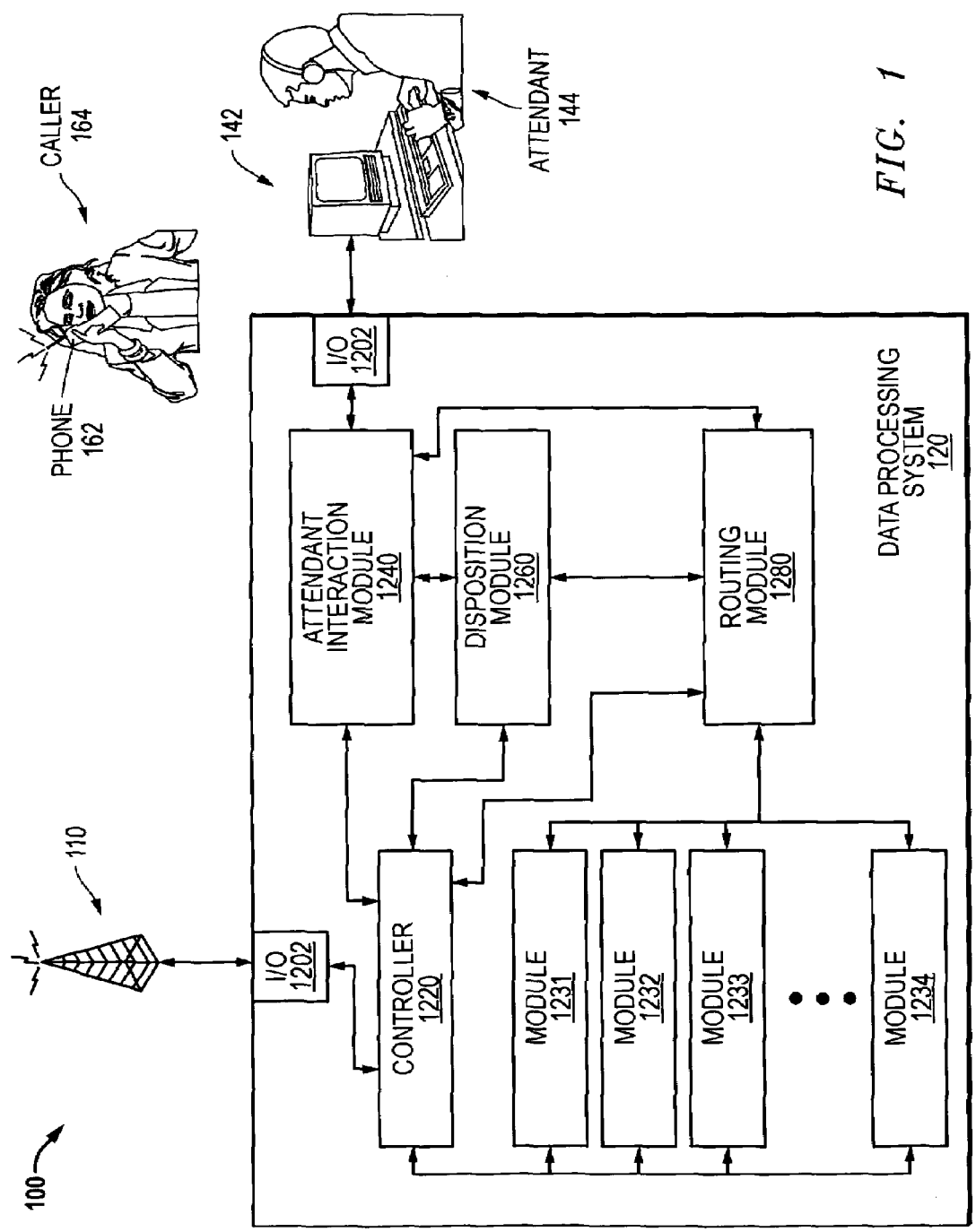
FIG. 1 includes a general diagram of a caller at a phone using a call service center including a call routing system.

Skilled artisans will appreciate that elements in the figures are illustrated for simplicity and clarity and have not necessarily been drawn to scale.

DETAILED DESCRIPTION

A call routing system can be used to route calls. An action object identifier, a result identifier, and a reason identifier can be generated in response at least in part to a call. The call can be routed by the call routing system based at least in part on the action object identifier, the result identifier, and the reason identifier. The routing can be performed automatically without requiring an attendant. The use of the action object identifier, the result identifier, and the reason identifier helps to improve accuracy when routing a call and to reduce caller frustration with the call routing system. In another embodiment, an attendant can be used, if desired. In still another embodiment, the processing of the call can be interrupted by the caller, a data processing system used within the call routing system, or an attendant. In a particular embodiment, the call routing system can be used when authenticating a caller or determining an account status of the caller. As described herein, the call routing system and its use are highly flexible and can be tailored to the needs or desires of an entity that controls the call routing system.

In a first aspect, a method of using a call routing system can include generating an action object identifier, a result identifier, and a reason identifier at a first module in response at least in part to a call. The method can also include routing the call from the first module to a second module based at least in part on the action object identifier, the result identifier, and the reason identifier.

In a second aspect, a data processing system can be used in call routing. The data processing system can include a first module configured to generate an action object identifier, a result identifier, and a reason identifier in response at least in part to a received call. The data processing system can also include a routing module configured to route the received call from the first module to a second module based at least in part on the action object identifier, the result identifier, and first reason identifier.

In a third aspect, a data processing system readable medium can have data to be used with a call routing system, wherein the data is embodied within the data processing system readable medium. The data can include instructions to generate an action object identifier, a result identifier, and a reason identifier at a first module in response at least in part to a call. The data can also include instructions to route the call from the first module to a second module based at least in part on the action object identifier, the result identifier, and the reason identifier.

In one embodiment, the action object identifier can be associated with a task that is being or was at least partially performed. In another embodiment, the result identifier can be associated with the task and has a value that indicates whether the task was successful or unsuccessful. In still another embodiment, the reason identifier can include information regarding why the task was determined to be successful or unsuccessful.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, for clarity purposes and to give a general sense of the scope of the embodiments described herein, the use of "a" or "an" are employed to describe one or more articles to which "a" or "an" refers. Therefore, the description should be read to include at least one whenever "a" or "an" is used, and the singular also includes the plural unless it is clear that the contrary is meant otherwise.

Unless stated otherwise, any combination of parts of a system may be bi-directionally or uni-directionally coupled to each other, even though a figure may illustrate only a single-headed arrow or a double-headed arrow. Arrows within the drawing are illustrated, as a matter of convenience, to show a principal information, data, or signal flow within the system or between the system and one or more components outside the system, one or more modules outside the system, another system, or any combination thereof in accordance with an embodiment. Coupling should be construed to include a direct electrical connection in one embodiment and alternatively, may include any one or more of an intervening switch, resistor, capacitor, inductor, router, firewall, network fabric or the like between any combination of one or more components, one or more devices, or one or more modules.

Unless otherwise defined, technical and scientific terms used herein have the same meaning as commonly understood by one of ordinary skill in the art. In addition, the methods and examples disclosed are illustrative only and not intended to be limiting.

FIG. 1 includes a general diagram of a caller using a call service center 100. The call service center 100 can receive a call from a caller that allows the caller to obtain information, products, or services, potentially without using an attendant. Thus, the call service center 100 can be used by a wide variety of businesses including manufactures, retailers, distributors, telephone service providers, airlines, etc. The call service center 100 can be designed as described herein to help to automate routing of calls within the call service center 100 while still allowing a human attendant to interact with the caller to reduce caller frustration, reduce the likelihood that the caller, who may intend on purchasing a product or service, leaves without successfully making the purchase, etc. After reading this specification, skilled artisans will appreciate that the architectures and methods described herein are highly flexible and can be adapted to the need or desires of the entity using a call service center.

The call service center 100 can include a data processing system 120 that is bi-directionally coupled to an antenna 110 and an attendant terminal 142. In another embodiment, the antenna 110 is not used, particularly if the phone 162 is a wireline phone, rather than a wireless phone as illustrated in FIG. 1. An attendant 144 can be present at the attendant terminal 142. A caller 164 can use a phone 162 to call the call service center 100 and transact business with the entity operating the call service center 100. The call includes speech of the caller 164 that may be received by the call service center 100. The caller 164 may or may not speak during the call. In one embodiment, the phone 162 is communicatively coupled to the data processing system 120, via the antenna 110. The phone 162 can include a wireline phone or a wireless phone. The phone 162 can include a conventional telephone, a cell phone, a voice over Internet protocol phone, or the like. Wires, switches, routers, or potentially other equipment (not illustrated) may be used to communicatively couple the phone 162 to the data processing system 120.

The data processing system 120 can be part of or include a call routing system, as described herein. Each of the antenna 110 and attendant terminal 142 can be coupled to the data processing system 120 through one or more input/output ("I/O") ports 1202. In another embodiment, separate input ports and output ports could be used. For simplicity, I/O ports collectively refer to any or all of input ports, output ports or input/output ports. The data processing system 120 further comprises a controller 1220 that is bi-directionally coupled to modules that are designed to perform actions as requested by a caller using the call service center 100. In the embodiment as illustrated in FIG. 1, the controller 1220 is bi-directionally coupled to module 1231, module 1232, module 1233, and module 1234. Each of the modules 1231 through 1234 can perform one or more actions at the call service center 100. Such actions can include authenticating caller 164, determining account status or other account information of the caller 164, providing information regarding products or services of the entity operation the call service center 100, allowing the caller 164 to purchase products or services at the call service center 100, perform other suitable action, or any combination thereof. More or fewer modules may be used.

The controller 1220 is also bi-directionally coupled to an attendant interaction module 1240, a disposition module 1260, and a routing module 1280. The attendant interaction module 1240 can allow an input signal from the attendant terminal 142 to be received when the attendant 144 is servicing a call. The attendant interaction module 1240 is bi-directionally coupled to the disposition module 1260 and the routing module 1280. The disposition module 1260 can receive an attendant interaction signal from the attendant interaction module 1240 or a signal from the controller 1220 in order to generate a disposition signal at the disposition module 1260 in order to disposition a call. The disposition module is bi-directionally coupled to the routing module 1280. The routing module 1280 may receive signals from the controller 1220, the attendant interaction module 1240, the disposition module 1260, any one or more of the modules 1231 through 1234, or any combination thereof in order to route the call to an appropriate module when servicing the call.

Although not illustrated, other connections and memories may reside in or be coupled to the data processing system 120. Such memories can include a hard disk, content addressable memory, static random access memory, cache, first-in-first-out ("FIFO"), a database, a storage network, other memories, or any combination thereof. The memories can include media that can be read by the data processing system 120. Therefore, each of the types of memory includes a data processing system readable medium.

Portions of the methods described herein may be implemented in suitable software code or other data for carrying out the methods described. In one embodiment, computer-executable instructions may be lines of assembly code or compiled C++, Java, or other language code. In another embodiment, the code may be contained on a data storage device, such as a hard disk, magnetic tape, floppy diskette, optical storage device, networked storage device(s), or other appropriate data processing system readable medium or storage device.

Functions preformed by any one or more of the modules may be combined with one or more other modules or the controller 1220. For example, the disposition module 1260 and the routing module 1280 may be combined into a single module. In still another embodiment, one or more of the modules may be located outside of the data processing system 120. For example, the attendant interaction module 1240 could reside in the attendant terminal 142. Further, more than one type of module may reside in one or more devices. For example, a disposition module may reside within the phone 162, the attendant terminal 142, or both in addition to or in place of the disposition module 1280 within the data processing system 120. Such disposition modules may be substantially the same or different when compared to each other. Also, any single module may be embedded within a plurality of integrated circuits, chip sets, circuit boards, or the like. Additionally, a software program or its software components with such code may be embodied in more than one data processing system readable medium in more than one computer or other item having a controller or a processor.

Figure 2:
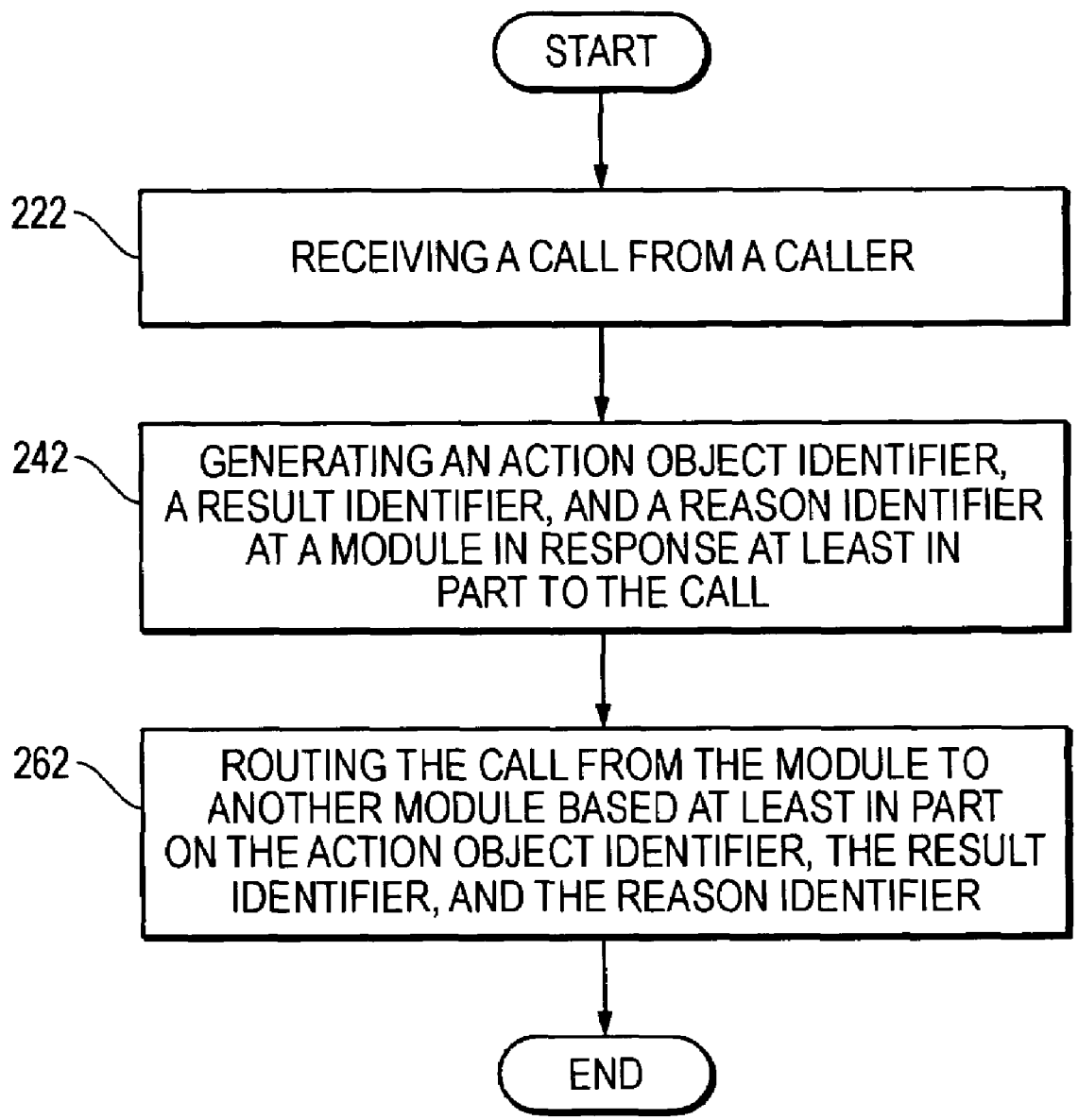
FIG. 2 is a flow diagram of a method of using a call routing system.

Attention is now directed toward a method of using a call routing system for the call service center 100 in accordance with an embodiment, as illustrated in FIG. 2. The method can include receiving a call from the caller 164, at block 222. The method can also include generating an action object identifier, a result identifier, and a reason identifier at a module in response at least in part to the call, at block 242.

In one embodiment, the action object identifier can be associated with a task that is being or was at least partially performed. In another embodiment, the result identifier can be associated with the task and has a value that indicates whether the task was successful or unsuccessful. In still another embodiment, the reason identifier can include information regarding why the task was determined to be successful or unsuccessful.

The method can further include routing the call from the module to another module based at least in part upon the action object identifier, the result identifier, and the reason identifier, at block 262. Some details regarding the operations performed as described in blocks 242 and 262 are described with respect to exemplary, non-limiting embodiments, as illustrated in FIGS. 3 through 6. Occasional references will be made to the call service center, as illustrated in FIG. 1, when describing methods as illustrated in FIGS. 3 through 6.

Figure 3:
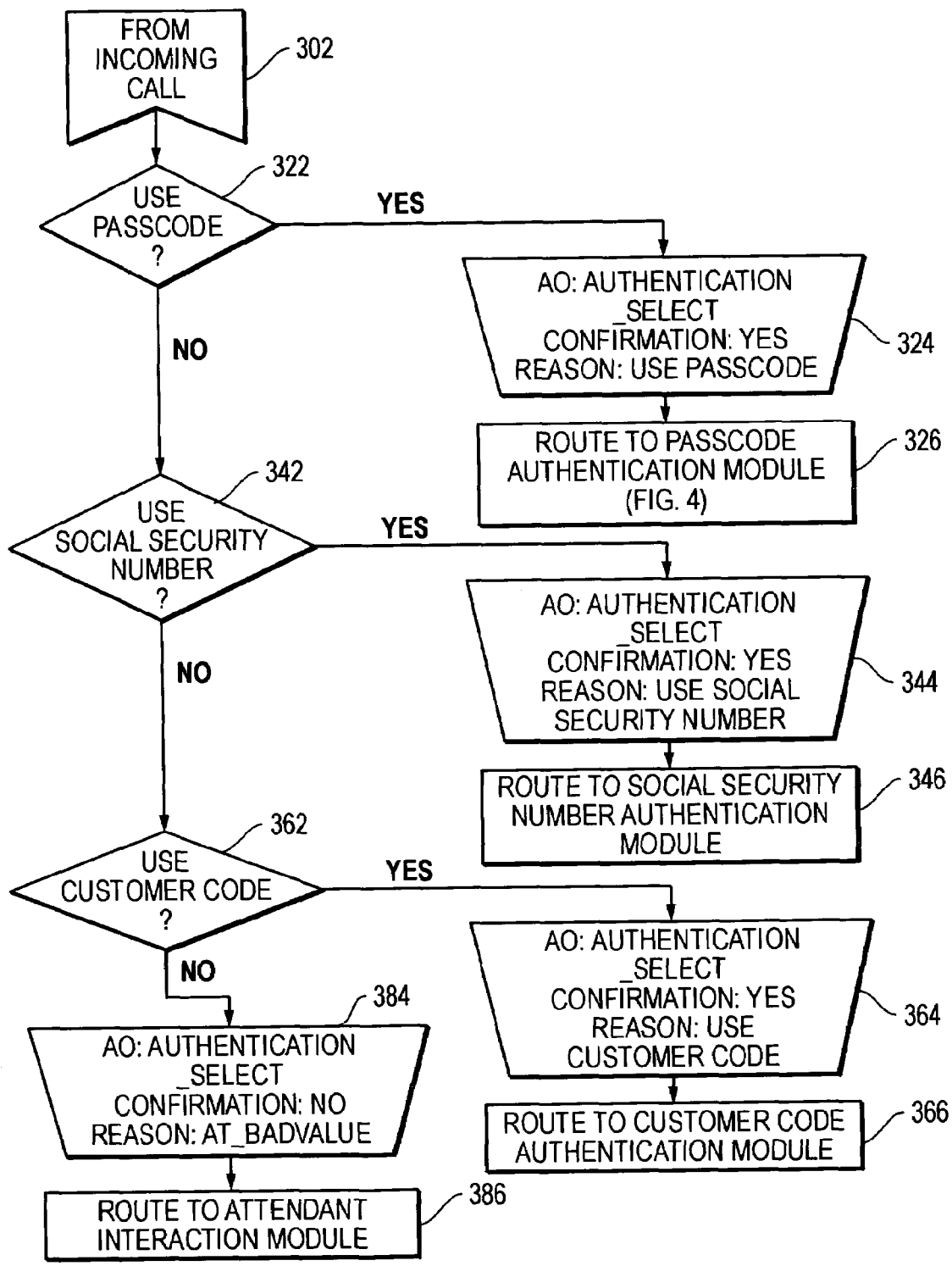
FIGS. 3 and 4 include flow diagrams of a method of authenticating a caller using the call service center of FIG. 1.
Figure 4:
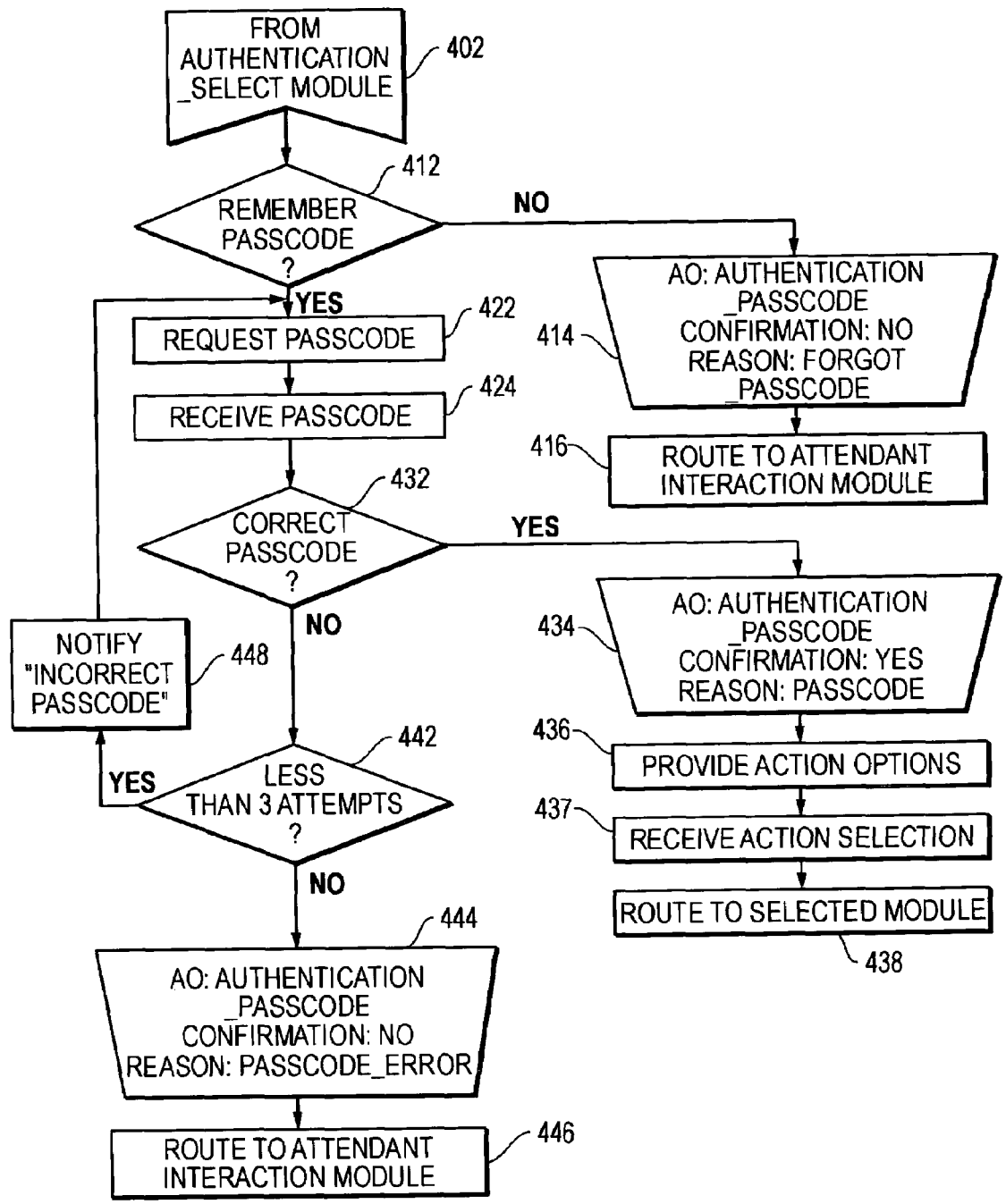

FIGS. 3 and 4 include process flow diagrams that illustrate potential actions that may occur within an authentication-select module and a pass code authentication module. Referring to FIG. 3, signals can be received from an incoming call, such as a call from the caller 164 at phone 162, at item 302. The call can be received at I/O port 1202 of the data processing system 120 via the antenna 110. The signal can be transmitted from the I/O port 1202 to the controller 1220. The controller 1220 may transmit the signals to an authentication-select module that may be module 1231 in FIG. 1. The authentication-select module can be used by the caller 164 to select the type of authentication that he or she desires in order to access his or her account. The transmission from the controller 1220 may be directly from the controller 1220 to the module 1231 or may occur via the routing module 1280.

The method can include determining whether to use a pass code, at decision act 322 in FIG. 3. In one embodiment, the data processing system 120 can generate signals and transmit the signals to the phone 162 instructing the caller 164 to determine whether the pass code should be used for authentication. The caller 164 can activate one or more keys, buttons, or other controls, or any combination thereof of the phone 162 to generate a user input signal that is received by the data processing system 120. If the pass code will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use PassCode," at block 324. The information as illustrated within block 324 can be used by the routing module 1280 to route the call, and optionally route any or all of the information within block 324 associated with the call, to a pass code authentication module, at block 326. Note that the pass code authentication module is a particular example of an authentication module. Referring to the data processing system as illustrated in FIG. 1, the pass code authentication module may be module 1232.

If the pass code will not be used to authenticate the caller 164 ("no" branch from decision act 322 in FIG. 3), the method can include determining whether to use the caller's social security number, at decision act 342. The procedure for determining whether to use the caller's social security number is substantially similar to the process described regarding determining whether to use the pass code. If the caller's social security number will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use SS#," at block 344. The information within block 344 can be used by the routing module 1280 to route the call, and optionally route any or all of the information within block 344 associated with the call, to a social security number authentication module, at block 346.

If the caller's social security number will not be used to authenticate the caller 164 ("no" branch from block 342 in FIG. 3), the method can include determining whether to use the caller's customer code, at decision act 362. The procedure for determining whether to use the caller's customer code is substantially similar to the process used to determine whether to use a pass code. If the caller's customer code will be used for authentication, an action object identifier, a result identifier, and a reason identifier can be generated by the authentication-select module. In one embodiment, the action object identifier can include "AO: Authentication_Select," the result identifier can include "Confirmation: Yes," and the reason identifier can include "Reason: Use CustomerCode," at block 364. The information within block 364 can be used by the routing module 1280 to route the call, and optionally route any or all of the information within block 364 associated with the call, to a customer code authentication module, at block 366.

In one particular embodiment, no other type of authentication is supported by the call service center 100. Therefore, if none of the types of authentication were selected, the caller 164 may be having problems. At this point, the caller may have the attendant 144 help the caller 164 in determining which type of authentication the caller desires, or to otherwise disposition the call. Returning to FIG. 3 ("no" branch from decision act 362), an action object identifier, a result identifier, and a reason identifier can be generated by the authentication-select module. In one embodiment, the action object identifier can include "AO: Authentication_Select," the result identifier can include "Confirmation: No," and the reason identifier can include "Reason: AT_badvalue," at block 384. The information within block 384 can be used by the routing module 1280 to route the call, and optionally route any or all of the information within block 324 associated with the call, to the attendant interaction module 1240, at block 386.

In another embodiment, the action object identifiers generated at the authentication-select module may be different. For example, the action object identifier in block 324 could be "AO: AT_PassCode," the action object identifier in block 324 could be "AO: AT_SS#," or the action object identifier in block 324 could be "AO: AT_CustomerCode." The actual names used are not critical. The controller 1220, routing module 1280, one or more other modules, or any combination thereof, can include logic, such that the module(s) can route the call based at least in part on a particular combination of action object identifier, result identifier, and reason identifier.

In one particular embodiment, the caller 164 may have selected to use the pass code to authenticate. A pass code authentication module will be used to authenticate the caller 164 so that the caller 164 can have access to the caller's account information. Referring to FIG. 4, the call can be transferred to the pass code authentication module from the authentication-select module, as illustrated in item 402. Referring to FIG. 1, the pass code authentication module may be module 1233.

The method can include determining whether the caller 164 can remember the caller's pass code, at decision act 412 in FIG.4. Referring to FIG. 1, the data processing system 120 can conduct a dialog with the caller 164 via the phone 162 and the antenna 110. The caller 164 can activate one or more keys, buttons, or other controls, or any combination thereof of the phone 162 to generate a user input signal that is received by the data processing system 120. If the caller 164 does not remember his or her pass code, another action object identifier, another result identifier, and another reason identifier can be generated by the pass code authentication module. In one embodiment, the action object identifier, the result identifier, and the reason identifier at block 324 may have been passed with the call. In this embodiment, generating can include changing the action object identifier, the result identifier, and the reason identifier as described with respect to block 324 to the other action object identifier, the other result identifier, and the other reason identifier, at block 414. In another embodiment, the action object identifier, the result identifier, and the reason identifier at block 324 are not passed with the call. In this embodiment, the pass code module can create the other action object identifier, the other result identifier, and the other reason identifier at block 414.

In one particular embodiment, the other action object identifier can include "AO: Authentication PassCode," the other results identifier can include "Confirmation: No," and the reason identifier can include "Reason: Forgot_Passcode," at block 414. The information within block 414 can be used by the routing module 1280 to route the call, and optionally route any or all of the information within block 414 associated with the call, to the attendant interaction module 1240, at block 416. The attendant 144 at the attendant terminal 142 can interact with the caller 164 at phone 162 to assist the caller 164 in proceeding by manually authenticating the caller 164.

If the caller 164 remembers his or her pass code ("yes" branch from decision act 412 in FIG. 4), the data processing system 120 can transmit a request to the phone 162 to have the caller 164 enter the pass code, at block 422. The caller 164 can enter the pass code into the phone 162 which in turn can generate a user input signal that is transmitted by the phone 162 and received by the data processing system 120, at block 424. The method can further include determining whether the pass code entered is correct, at decision act 432.

If the caller 164 provided the correct pass code, the pass code authentication module can generate an action object identifier, a result identifier, and a reason identifier that reflects the successful authentication using the pass code. In one embodiment, the action object identifier can include "AO: Authentication_PassCode," the results identifier can include "Confirmation: Yes," and the reason identifier can include "Reason: PassCode," at block 434. The caller 164 may be able to continue to use the call service center 100 to conduct business or perform other actions as allowed by the call service center 100. In one particular embodiment, the method can still further include providing action options that can be transmitted from the data processing system 120 to the phone 162, at block 436, receive an action select signal from the phone 162, at block 437, and route the call to the selected module associated with the action select signal, at block 438.

The caller 142 may be allowed up to three attempts to enter the correct pass code. If the pass code is not correct ("no" branch from decision act 432), the method can determine if less than three attempts for the correct pass code has occurred, at decision act 442. If yes, the method can include notifying the caller that an incorrect pass code was received, at block 448. The method can include requesting the pass code, receiving the pass code, and determining if the pass code is correct. After three unsuccessful attempts ("no" branch from decision act 442), an action object identifier, a result identifier, and a reason identifier can be generated by the pass code authentication module. In one embodiment, the action object identifier can include "AO: Authentication_PassCode," the result identifier can include "Confirmation: No," and the reason identifier can include "Reason: Passcode_Error," at block 444. The information at block 444 can be used by the routing module 1280 to route the call, and optionally route any or all of the information associated with the call, to the attendant interaction module 1240, at block 446.

Figure 5:
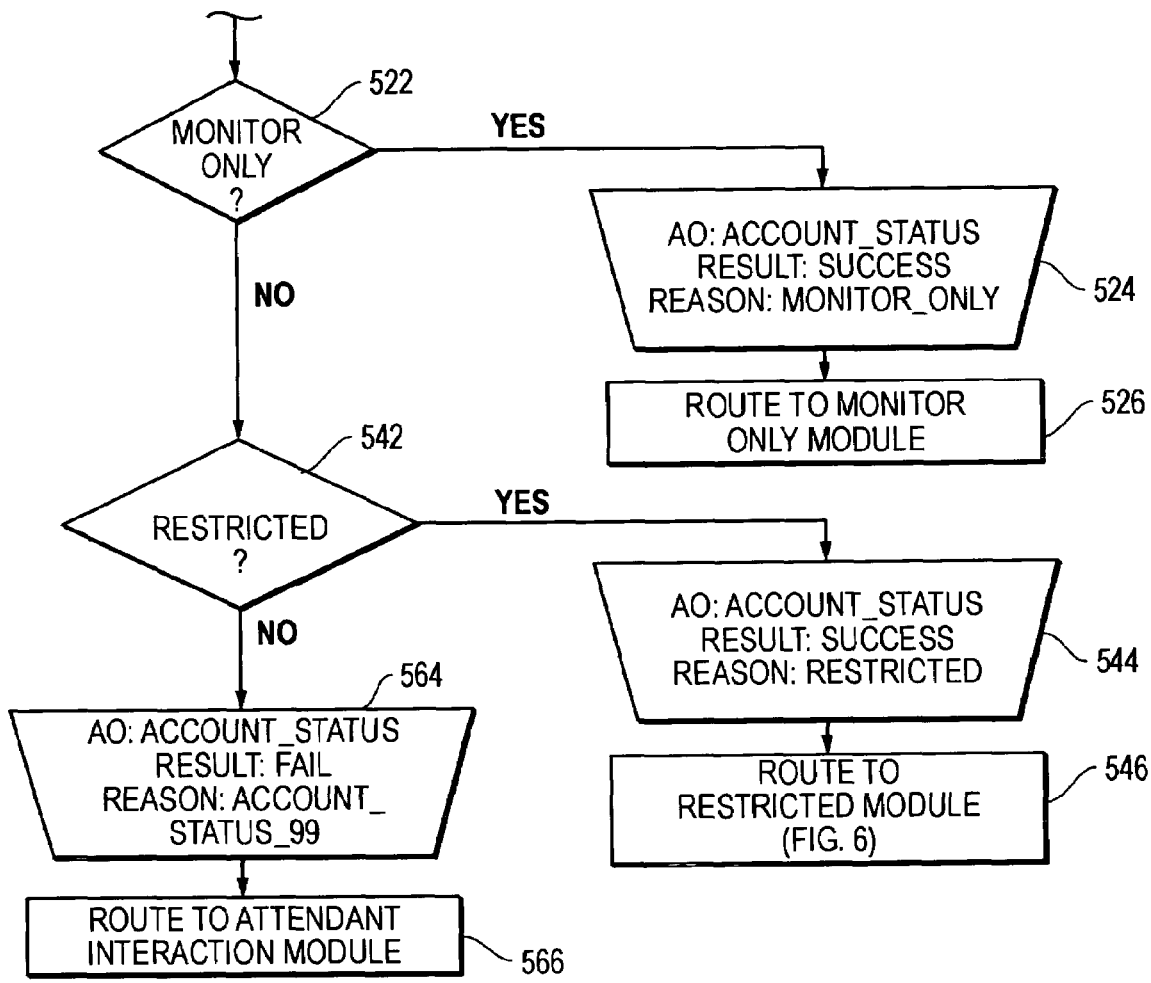
FIGS. 5 and 6 include flow diagrams of a method using a call routing system with a caller having a restricted account using the call service center of FIG. 1.

In another particular embodiment, an account-status module and a restricted-account module can be used by the data processing system 120 when servicing the caller 164 at phone 162. The caller 164 may have initiated a call from the phone 162 that is currently being processed by the data processing system 120. An entity may need to reduce the likelihood that a customer, such as the caller 164 at the phone 162, may exceed a credit limit or otherwise purchase products or services where the likelihood of collecting money from the customer may be difficult or impossible, based at least in part on historic account data. In this particular embodiment, an account-status module can be used to reduce the likelihood of the caller 164 entering into a transaction that should otherwise be avoided or authorized on an ad-hoc basis. Referring to FIG. 5, an account-status module can be used to determine whether the account for the caller 164 is on monitor-only status or restricted status. The account-status module can retrieve account status information for the caller 164 from a database, hard disk, or other storage device (not illustrated).

If the account is on monitor-only status ("yes" branch from decision act 522 in FIG. 5), the account-status module can generate an action object identifier, a result identifier, and a reason identifier that reflects such status information. In one particular embodiment, the action object identifier can include "AO: Account_Status," the result identifier can include "Result: Success," and the reason identifier can include "Reason: Monitor Only," at block 524. The information at block 524 can be used by the routing module 1280 to route the call, and optionally route any or all of the information associated with the call, to a monitor-only module, at block 526.

If the account is not on monitor-only status ("no" branch from decision act 522), the method can include determining whether the account is on restricted status, at decision act 542. The account-status module can use account status information to make the determination. If the caller's account in on restricted status, the account-status module can generate an action object identifier, a result identifier, and a reason identifier that reflects the restricted status. In one particular embodiment, the action object identifier can include "AO: Account_Status," the results identifier can include "Result: Success," and the reason identifier can include "Reason: Restricted," at block 544. The information can be used by the routing module 1280 to route the call, and optionally route any or all of the information associated with the call to a restricted module, at block 546. The restricted module will be described in more detail with respect to FIG. 6.

At this point, the account status may not be able to be determined by the account-status module. The call may require the attendant 144 to determine the account status of the caller. If the account is not on monitor-only or restricted status ("no" branch from decision act 542), the account-status module can generate an action object identifier, a result identifier, and a reason identifier that reflects an indeterminate account status. In one particular embodiment, the action object identifier can include "AO: Account_Status," the results identifier can include "Result: Fail," and the reason identifier can include "Reason: Account_Status99," at 564. In one particular embodiment, the information can be used by the routing module 1280 to route the call, and optionally route any or all of the information associated with the call, to the attendant interaction module 1240, at block 566.

In one embodiment, the caller's account may be on restricted status. As such, the entity operating the call service center 100 may need to limit what the caller 164 purchases or can otherwise limit actions of the caller at the call service center 100. In one particular embodiment, the call and optionally any or all of the associated information can be routed to the restricted module from the account-status module, at item 602 in FIG. 6. Account status information associated with the caller's account may be transmitted from the data processing system 120 to the phone 162 for the caller's use. The transmission can include information, such as credit limit, account balance, estimated fees or costs, any other account information, or any combination thereof. The transmission can also include providing the caller 164 one or more options regarding the call. Block 622 includes one non-limiting example of information that may be transmitted from the data processing system 120 to the phone 162.

Figure 6:
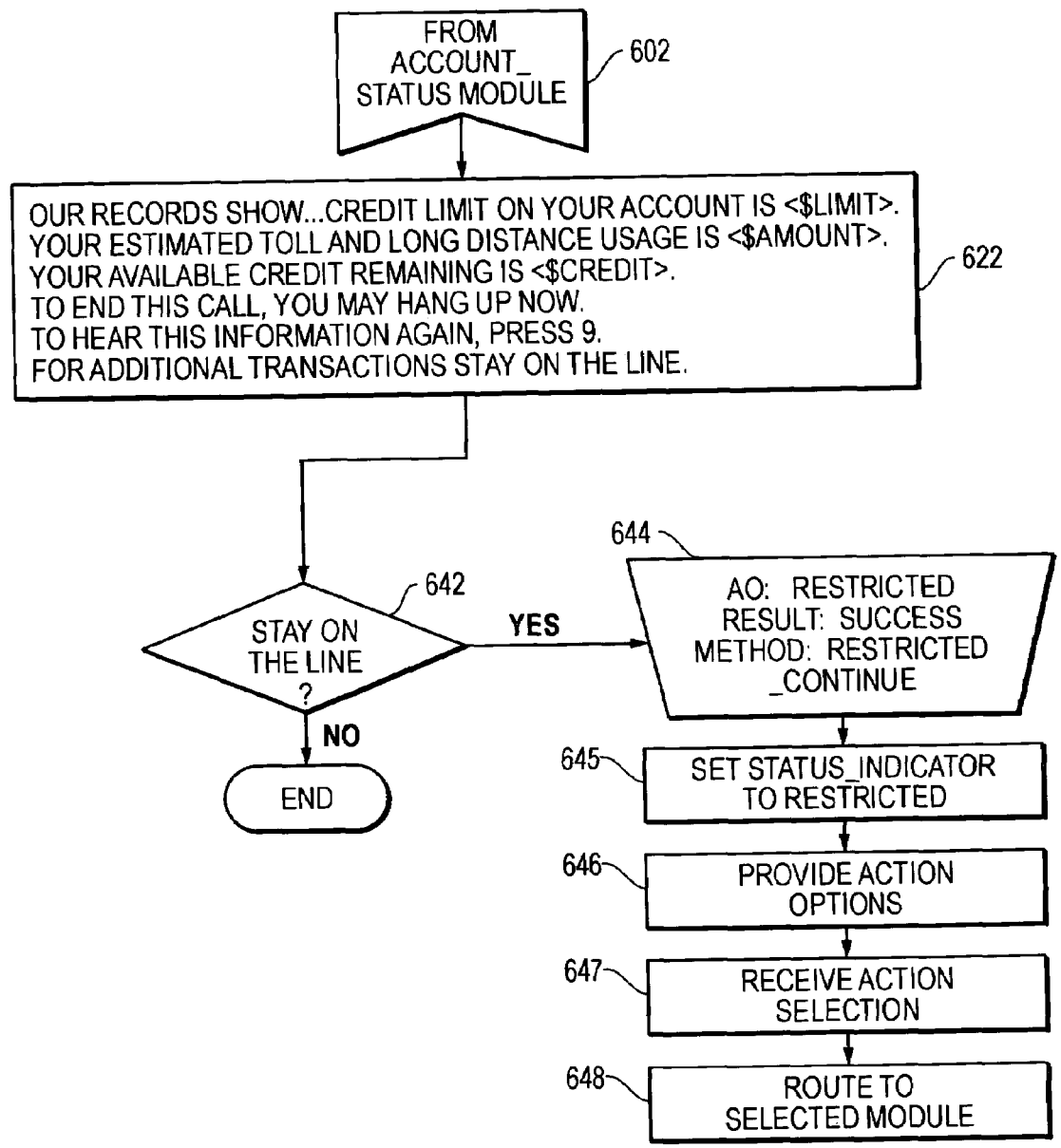

In one particular embodiment, the method can include determining whether the caller 164 desires to stay on the line, at decision act 642 in FIG. 6. If not, the caller 164 can terminate the call. If the caller 164 desires to stay on the line, the data processing system 120 can receive a user input signal corresponding to the caller 164 desiring to stay on the line. The restricted module can generate an action object identifier, a result identifier, and a reason identifier that reflects the restricted status. In one particular embodiment, the action object identifier can include "AO: Restricted," the results identifier can include "Result: Success," and the reason identifier can include "Restricted_Continue," at block 464. The method can further include setting an account status indicator to restricted, at block 645. In one embodiment, the account status indicator may be used to reduce the likelihood that the caller 164 will exceed the caller's credit limit, and in another embodiment, may allow an attendant (e.g., an account representative) to override the credit limit, if desired, later during the call. Referring to FIG. 6, the method can also include providing action options to the caller 164, at block 646, receiving an action selection from the phone 162, at block 647, and route the call to be selected module associated with the selected action, at block 648.

In still another embodiment, the method may be interrupted at potentially nearly any time because the caller 164 made a wrong selection, the attendant 144 may determine that the caller 164 appears to be lost, the controller 1220 may determine that the call has been in a module too long or is causing an infinite loop to be performed by a module, or for another reason. Therefore, an interrupt signal may be generated by the phone 162, the attendant terminal 142, or the data processing system 120. The interrupt signal can be used to at least temporarily stop processing in order for another action to be taken.

For example, the caller 164 may determine that he or she desires to have an attendant 144 service the call. The phone 162 can generate an interrupt signal that is received by the controller 1220 of the data processing system 120. The controller 1220 can then transmit one or more signals to any one or more modules within the data processing system 120. For example, the controller 1220 can instruct the routing module to route the call, and optionally communicate an action object identifier, a result identifier, and a reason identifier with the routed call to the attendant interaction module 1240. The attendant interaction module 1240 can transmit a notice to the attendant terminal 142 for the attendant 144 to service the call. The attendant terminal 142 can then transmit one or more signals to the attendant interaction module 1240 that can generate an attendant interaction signal. The attendant interaction signal-can be transmitted to the disposition module 1260, which in turn, can generate a disposition signal that can be transmitted to the routing module 1280. During the process, the call, and optionally the action object identifier, the result identifier, and the reason identifier, can be passed from one module to another module. When the action object identifier, the result identifier, and the reason identifier are passed with the call, the modules within the data processing system 120, or the attendant 144 in the attendant terminal 142, may quickly analyze status information regarding the call without having to access a log file or otherwise retrieve data from storage. By not having to analyze data within a log file or retrieving information from storage, handling of the call at the call service center 100 may be done more quickly and efficiently.

Whenever an action object identifier, a result identifier, a reason identifier, or any combination thereof is generated or used to route a call, such information can be stored within a log file. The log file can be used by the attendant analyzing call data to improve or otherwise change a configuration of the call service center, or for another reason.

The use of the action object identifier, the result identifier, and the reason identifier by a call routing system can allow for more accurate routing of a call within a call service center. The likelihood of inaccurate routing or unnecessary human intervention by an attendant can be significantly reduced. Retrieving a log file or information from a database is not needed in order to use the call routing system as described. Therefore, more accurate automated routing with less human intervention can be achieved with a call routing system.

The call routing system may be used in a wide variety of call service centers. The call service center 100 may be used by manufacturers, retailers, distributors, telephone service providers, airlines, etc. or other businesses that support a customer call center. In one non-limiting embodiment, the call center 100 can include a speech-enabled, self-service call routing system or call service center for performing one or more transactions or obtaining information from the entity that controls the call service center 100.

Note that not all of the activities described above in the general description or the examples are required, that a portion of a specific activity may not be required, and that one or more further activities may be performed in addition to those described. Still further, the order in which activities are listed are not necessarily the order in which they are performed.

Any one or more benefits, one or more other advantages, one or more solutions to one or more problems, or any combination thereof have been described above with regard to one or more particular embodiments. However, the benefit(s), advantage(s), solution(s) to problem(s), or any element(s) that may cause any benefit, advantage, or solution to occur or become more pronounced is not to be construed as a critical, required, or essential feature or element of any or all of the claims.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of using a call routing system, the method comprising:

generating a first action object identifier associated with a task, a first result identifier associated with the task and having a value that indicates a status of the task, and a first reason identifier that includes information related to the first result identifier at a first module in response at least in part to a call using a processor of the call routing system;

routing the call to the first module, wherein the first module is an authentication-select module;

receiving information from a caller, the information from the caller regarding a type of authentication to be used; and routing the call from the first module to a second module using the processor, based at least in part on the first action object identifier, the first result identifier, and the first reason identifier;

wherein generating the first action object identifier, the first result identifier, and the first reason identifier is performed at least in part based on the information from the caller; and wherein routing the call comprises passing the call, the first action object identifier, the first result identifier, and the first reason identifier to the second module.

2. The method of claim 1, wherein the call includes speech of the caller.

3. The method of claim 1, wherein the status of the task in the first result identifier indicates whether the task was successful or unsuccessful.

4. The method of claim 1, wherein the information identifies the type of authentication to be used as a pass code.

5. The method of claim 1, wherein the second module comprises
an authentication module, and further comprising:
receiving at the second module authentication information from the caller, wherein the authentication information includes authentication information of an account;
generating a second action object identifier, a second result identifier, and a second reason identifier based at least in part on the authentication information of the account; and
passing the call, the second action object identifier, the second result identifier, and the second reason identifier to a third module.

6. The method of claim 1, wherein the information identifies the type of authentication to be used as a customer code.

7. The method of claim 5, wherein the third module is an account status module.

8. The method of claim 7, further comprising determining whether the account includes a monitor-only status, a restricted status, or a combination thereof.

9. A data processing system comprising:
a processor;
a memory coupled to the processor;
a first module in the memory and executable by the processor to generate a first action object identifier associated with a task, a first result identifier associated with the task and having a value that indicates a status of the task, and a first reason identifier that includes information related to the first result identifier in response at least in part to a received call; and
a routing module in the memory and executable by the processor to route the received call from the first module to a second module based at least in part on the first action object identifier, the first result identifier, and the first reason identifier, wherein the second module is an attendant interaction module that is configured to:
transmit the first action object identifier, the first result identifier, and the first reason identifier to a first output port;
receive an attendant interaction signal from a first input port; and
transmit the attendant interaction signal to a disposition module.

10. The data processing system of claim 9, wherein the received call includes speech of a caller.

11. The data processing system of claim 9, wherein the status of the task in the first result identifier indicates whether the task was successful or unsuccessful.

12. The data processing system of claim 9, wherein the first module is a controller.

13. The data processing system of claim 9, wherein the disposition module is configured to:
receive an input signal from a controller or the attendant interaction module;
generate a disposition signal in response at least in part to the input signal; and
transmit the disposition signal to the routing module.

14. The data processing system of claim 9, wherein the routing module is configured to:
receive an input signal from a controller, the attendant interaction module, or the disposition module; and
route the received call to a third module in response at least in part to the input signal.

15. The data processing system of claim 13, wherein the routing module is further configured to receive the disposition signal from the disposition module, and wherein the routing module is configured to route the received call from the first module to the second module in response at least in part to the disposition signal.

16. A data processing system readable medium having data to be used with a call routing system, wherein the data is embodied within the data processing system readable medium, the data comprising:
instructions to generate a first action object identifier associated with a task, a first result identifier associated with the task and having a value that indicates a status of the task, and a first reason identifier that includes information related to the first result identifier at a first module in response at least in part to a call, wherein the instructions to generate the first action object identifier, the first result identifier, and the first reason identifier comprises at least one of:
instructions to change a second action object identifier received at the first module to the first action object identifier;
instructions to change a second result identifier received at the first module to the first result identifier; and
instructions to change a second reason identifier received at the first module to the first reason identifier; and
instructions to route the call from the first module to a second module based at least in part on the first action object identifier, the first result identifier, and the first reason identifier.

17. The data processing system readable medium of claim 16, wherein the call includes speech of a caller.

18. The data processing system readable medium of claim 17, wherein the call routing system comprises a speech-enabled, self-service call routing system.

19. The data processing system readable medium of claim 16, wherein the first module comprises a controller.

20. The data processing system readable medium of claim 16, wherein the data further comprises instructions to transmit the first action object identifier, the first result identifier, and the first reason identifier from the first module to the second module.

21. The data processing system readable medium of claim 16, wherein the data further comprises instructions to interrupt routing of the call in response to an interrupt signal.

22. The data processing system readable medium of claim 16, wherein the data further comprises instructions to route the call, the first action object identifier, the first result identifier, and the first reason identifier to an attendant interaction module, wherein the second module is the attendant interaction module.

23. The data processing system readable medium of claim 22, wherein the data further comprises instructions to generate a disposition signal in response at least in part to an attendant interaction signal.

24. The data processing system readable medium of claim 23, further comprising instructions to route the call from the second module to a third module based at least in part on the disposition signal.

25. The data processing system readable medium of claim 16, wherein the status of the task in the first result identifier indicates whether the task was successful or unsuccessful.

* * * * *